US012785855B2

(12) United States Patent
Cao et al.

(10) Patent No.: US 12,785,855 B2
(45) Date of Patent: Nov. 3, 2026

(54) METHODS, APPARATUS AND SYSTEMS FOR SIGNAL CONSTRUCTION IN A WIRELESS COMMUNICATION

(71) Applicant: ZTE Corporation, Shenzhen (CN)

(72) Inventors: Wei Cao, Shenzhen (CN); Nan Zhang, Shenzhen (CN); Zhen Yang, Shenzhen (CN); Wei Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 642 days.

(21) Appl. No.: 17/675,827

(22) Filed: Feb. 18, 2022

(65) Prior Publication Data

US 2022/0255667 A1 Aug. 11, 2022

Related U.S. Application Data

(63) Continuation of application No. PCT/CN2020/086618, filed on Apr. 24, 2020.

(51) Int. Cl.

| | |
|---|---|
| ***H04L 5/00*** | (2006.01) |
| ***H04L 1/00*** | (2006.01) |
| ***H04L 1/08*** | (2006.01) |
| ***H04W 72/04*** | (2023.01) |
| ***H04W 72/044*** | (2023.01) |

(52) U.S. Cl.

CPC .............. *H04L 1/08* (2013.01); *H04L 1/0071* (2013.01); *H04L 5/0044* (2013.01); *H04W 72/044* (2013.01)

(58) Field of Classification Search

CPC ....... H04L 1/08; H04L 1/0071; H04L 5/0044; H04L 5/0053; H04L 5/0094; H04L 5/0048; H04L 5/0091; H04W 72/044

See application file for complete search history.

(56) References Cited

U.S. PATENT DOCUMENTS

| | | | | |
|---|---|---|---|---|
| 9,755,881 | B1 | 9/2017 | Moshavi et al. | |
| 2010/0157896 | A1 | 6/2010 | Kim et al. | |
| 2015/0280876 | A1 | 10/2015 | You et al. | |
| 2018/0062904 | A1* | 3/2018 | Hwang | H04L 27/2615 |
| 2018/0205512 | A1 | 7/2018 | You et al. | |

(Continued)

FOREIGN PATENT DOCUMENTS

| | | | |
|---|---|---|---|
| CN | 104798329 | A | 7/2015 |
| CN | 106664136 | A | 5/2017 |

(Continued)

OTHER PUBLICATIONS

Examination Report issued in related Indian Application No. 202217050571 mailed Dec. 1, 2023 (5 pages).

(Continued)

*Primary Examiner* — Faruk Hamza
*Assistant Examiner* — Aixa A Guadalupe Cruz
(74) *Attorney, Agent, or Firm* — Crowell & Moring LLP

(57) ABSTRACT

Methods, apparatus and systems for signal construction in a wireless communication are disclosed. In one embodiment, a method performed by a wireless communication node is disclosed. The method comprises: generating a hyper-subframe based on N identical subframes, wherein N is an integer larger than one; and transmitting, to a wireless communication device, at least one signal in the hyper-subframe.

20 Claims, 20 Drawing Sheets

(56) References Cited

U.S. PATENT DOCUMENTS

| | | | | |
|---|---|---|---|---|
| 2018/0323897 | A1* | 11/2018 | Arnott | H04W 72/0466 |
| 2019/0288811 | A1 | 9/2019 | Chang et al. | |
| 2020/0178258 | A1* | 6/2020 | Park | H04L 1/08 |
| 2023/0075748 | A1* | 3/2023 | Yan | H04L 1/0003 |

FOREIGN PATENT DOCUMENTS

| | | | |
|---|---|---|---|
| CN | 106911438 | | 6/2017 |
| CN | 107078765 | A | 8/2017 |
| CN | 107181577 | A | 9/2017 |
| CN | 110447298 | A | 11/2019 |
| CN | 111052661 | A | 4/2020 |
| WO | WO 2017/049625 | A1 | 3/2017 |
| WO | WO 2019/004729 | A1 | 1/2019 |
| WO | WO 2019/100264 | A1 | 5/2019 |

OTHER PUBLICATIONS

European Search Report for European Application No. 20 89 7052 mailed Jun. 23, 2023 (8 pages).

Office Action issued in related Japanese Application No. 2022-510816 mailed Feb. 28, 2024 (17 pages) with translation.

Intel Corporation, "Discussion on subframe bitmap for V2V communication" 3GPP TSG RAN WG1 Meeting #86bis: R1-1610363, Oct. 14, 2016 (3 pages).

International Search Report and Written Opinion for Application No. PCT/CN2020/086618 mailed Jan. 27, 2021 (6 pages).

Office Action issued in Chinese Patent Application No. 2020800956019 mailed Nov. 27, 2024 (14 pages) with English translation.

Chinese Office Action with English translation, dated Mar. 26, 2025, issued in Chinese Patent Application No. 202080095601.9 (10 Pages).

Korean Office Action with English translation, dated Mar. 26, 2025 issued in Korean Patent Application No. 10-2022-7005446 (8 pages).

3GPP TSG RAN WG1 Meeting #98bis, Chongqing, China, Oct. 14-18, 2019, R1-1910150 (7 pages).

3GPP TSG-RAN WG1 Meeting #98bis, Chongqing, China, Oct. 14-20, 2019, R1-1910871 (17 pages).

Korean Office Action with English translation, dated Nov. 26, 2025 issued in Korean Patent Application No. 10-2022-7005446 (7 pages).

* cited by examiner

100

METHODS, APPARATUS AND SYSTEMS FOR SIGNAL CONSTRUCTION IN A WIRELESS COMMUNICATION

CROSS-REFERENCE TO RELATED APPLICATIONS

This application is a continuation of International Patent Application No. PCT/CN2020/086618, filed Apr. 24, 2020. The contents of International Patent Application No. PCT/CN2020/086618 are incorporated herein by reference in their entirety.

TECHNICAL FIELD

The disclosure relates generally to wireless communications and, more particularly, to methods, apparatus and systems for signal construction in a wireless communication.

BACKGROUND

With the development of the fifth generation (5G) new radio (NR) access technologies, a broad range of use cases including enhanced mobile broadband, massive machine-type communications (MTC), critical MTC, etc., can be realized. To expand the utilization of NR access technologies, 5G connectivity via satellites and/or airborne vehicles is being considered as a promising application. A network incorporating satellites and/or airborne vehicles to perform the functions (either full or partial) of terrestrial base stations is called a non-terrestrial network (NTN).

In NTNs, a base station (BS) on satellite or an airborne vehicle may move with high speed, which causes a remarkable and variant Doppler effect. To alleviate this Doppler effect due to movement of BS, pre-compensation of Doppler effect at the BS side can be carried out using a predictable trace of BS. However, the coverage of a BS on-board is generally much larger than that of a typical terrestrial BS. In addition, the Doppler pre-compensation at BS side can only be calculated using some given reference point(s) in the whole coverage instead of on a per UE basis. If the Doppler effect of BS is informed to a user equipment (UE) by broadcast or uni-cast, the signaling overhead may increase with a shorter signaling period. Hence the trade-off between timely Doppler information and signaling overhead should be considered carefully.

To serve massive UEs in the coverage of a BS on-board, one method is to estimate frequency offset (FO) at the UE side using downlink (DL) reference signals (RSs). But some problems have not yet been solved in NTN scenarios. First, the density of DL RSs in the time domain determines the range of FO estimation. Hence a design of a dense enough DL RS is required in the time domain. Second, the time-frequency resource used by the DL RSs determines the accuracy of FO estimation, especially in NTN scenarios with a significant path loss. As such, the trade-off between acceptable FO estimation range/accuracy and the DL RSs' overhead should be considered carefully. Existing methods for FO estimation based on RSs have a low RS density in the time and frequency domain, which limits the range and accuracy of FO estimation achievable at the UE side.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: generating a hyper-subframe based on N identical subframes, wherein N is an integer larger than one; and transmitting, to a wireless communication device, at least one signal in the hyper-subframe.

In another embodiment, a method performed by a wireless communication device is disclosed. The method comprises: determining a hyper-subframe based on N identical subframes, wherein N is an integer larger than one; and receiving, from a wireless communication node, at least one signal in the hyper-subframe.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
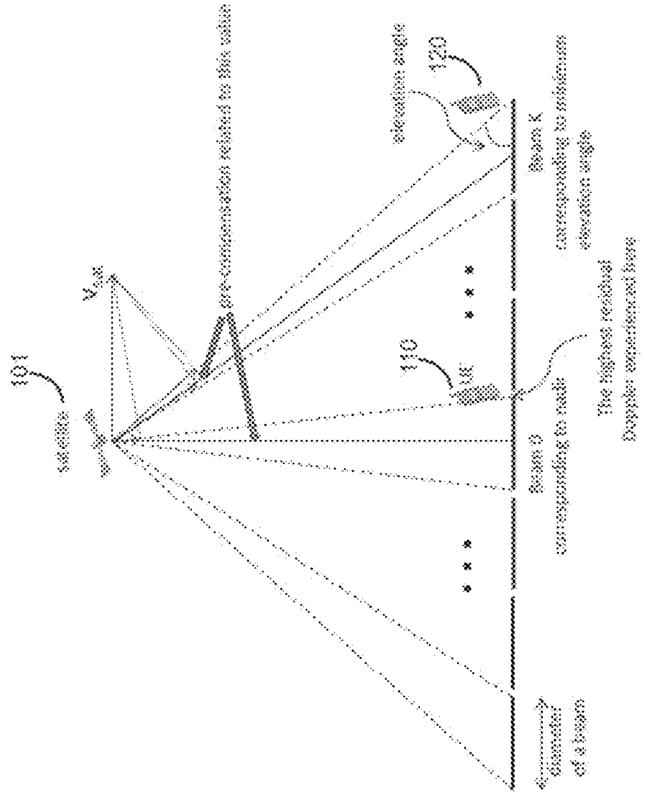
FIG. 1 illustrates an exemplary communication network in which techniques disclosed herein may be implemented, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. In a non-terrestrial network (NTN), a BS on satellite or an airborne vehicle may move with high speed relative UEs associated with the BS, which causes a remarkable and variant Doppler effect. While a repetition in signal transmission can combat the path loss due to long propagation distance and big coverage in the NTN. This present teaching proposes a novel method to take the advantage of repeated transmission to achieve a high range and accuracy of frequency offset estimation (FOE) without an extra requirement on the reference signal (RS).

In some embodiments of the present teaching, to deal with the Doppler effect due to BS movement in NTN scenarios, repeated transmission can be used to enable data-aided FOE. For example, identical orthogonal frequency-division multiplexing (OFDM) symbols form a symbol-group to facilitate FOE before channel estimation (CE) and equalization (EQU). The disclosed method can at least: (1) significantly improve the accuracy of FOE without extra requirement on RS resource, (2) significantly improve the range of FOE to cope with the large Doppler, and (3) effectively lower the receiver complexity with FOE before CE and EQU.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), a non-terrestrial reception point for satellite/fire balloon/unmanned aerial vehicle (UAV) communication, a radio transceiver in a vehicle of a vehicle-to-vehicle (V2V) wireless network, etc.: while a UE in the present disclosure can be referred to as a terminal and can include, or be implemented as, a mobile station (MS), a station (STA), a terrestrial device for satellite/fire balloon/unmanned aerial vehicle (UAV) communication, a radio transceiver in a vehicle of a vehicle-to-vehicle (V2V) wireless network, etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with some embodiments of the present disclosure. As shown in FIG. 1, the exemplary communication network 100 is a NTN scenario which includes a base station (BS) 101 on satellite and a plurality of UEs 110, 120, where the BS 101 can communicate with the UEs according to wireless protocols. The satellite is moving in this example with a speed Vsat, while transmitting beams to the UEs.

To deal with the Doppler effect due to BS movement, a Doppler pre-compensation can be carried out at the BS side as shown in FIG. 1. The Doppler effect due to predictable BS movement is pre-compensated per beam, which results in a zero downlink Doppler frequency offset experienced at the beam center or some other given reference point. But the residual Doppler in a beam can still be large at locations other than the beam center or some other given reference points.

To facilitate the estimation of Doppler due to BS movement in NTN scenarios, DL RSs can be used. DL RS design in typical communication systems has a low RS density, which limits the range and accuracy of FOE achievable at the UE side.

In one example, in a long-term evolution (LTE) cell-specific reference signal (CRS) resource mapping for 2 antenna ports, only 2 resource elements (REs) with an interval of 7 OFDM symbols are used per 1 millisecond (ms) for LTE CRS on each antenna port. Similarly, only 2 REs are used per physical resource block (PRB) for LTE CRS on each antenna port. Therefore, the range and accuracy of FOE using LTE CRS are limited.

In another example, in a narrowband-Internet of Things (NB-IoT) RS resource mapping for 2 antenna ports, only 2

REEs with an interval of 7 OFDM symbols are used per 1 ms on each antenna port, and only 2 REs per PRB are used on each antenna port. Therefore, the range and accuracy of FOE using NB-IoT RS are also limited.

In yet another example, in an NR demodulation reference signal (DMRS) resource mapping for 4 antenna ports, each corresponding to a given UE, only 2 REs with an interval of 0 OFDM symbol per 1 ms are used on each antenna port; and only 3 REs per PRB are used after orthogonal cover code (OCC) combination on each antenna port. Therefore, the range and accuracy of FOE using NR DMRS are also limited.

In various embodiments of the present teaching, repeated transmission can be used to enable data-aided FOE, where multiple identical OFDM symbols may form a symbol-group in a hyper-subframe to facilitate FOE. In one embodiment, a hyper-subframe is constructed using N (with N>1 and N<=repetition time) identical subframes in the repetition. For example, a hyper-subframe can be a dual-subframe with N=2, or a quaternary-subframe or quadruple-subframe with N=4. In the hyper-subframe, a symbol-group is constructed by N identical symbols. The identical symbols are bit-level identical. That is, they have the same bits after bit-level scrambling. The symbol-level scrambling may be different.

In various embodiments of the present teaching, the hyper-subframe is a signal structure with consecutive identical symbols in the time domain after repetition. The hyper-subframe can also be regarded as a repetition pattern resulted from a designed resource mapping or a hyper-subframe generation method.

In one embodiment, the hyper-subframe can be constructed by a symbol-group built after resource mapping. In another embodiment, the hyper-subframe can be constructed in resource mapping by symbol-level repetition.

To generate the hyper-subframe, the value of N (number of subframes in a hyper-subframe) may be informed to UE by the network, which can be carried by a broadcasting signaling or UE-specific signaling. In the time-frequency domain resource mapping, a symbol-level interleaving (column exchange) or a puncture technique can be utilized for data signals to co-exist with reference signals.

In one embodiment, repetition cycles of hyper-subframes can be used in entire repetition to improve timely reception processing. The value of L (number of identical subframes in a hyper-subframe repetition cycle) may be informed to the UE by the network, which can be carried by broadcast or UE-specific signaling.

To ensure identical bits of symbols forming a same symbol-group, a re-initialization of bit-level scrambling sequence may be carried out at the beginning of each hyper-subframe. The re-initialization of bit-level scrambling sequence can also be carried out at the beginning of repetition cycles of hyper-subframes, so long as the symbols in a symbol-group are bit-level identical.

Figure 2:
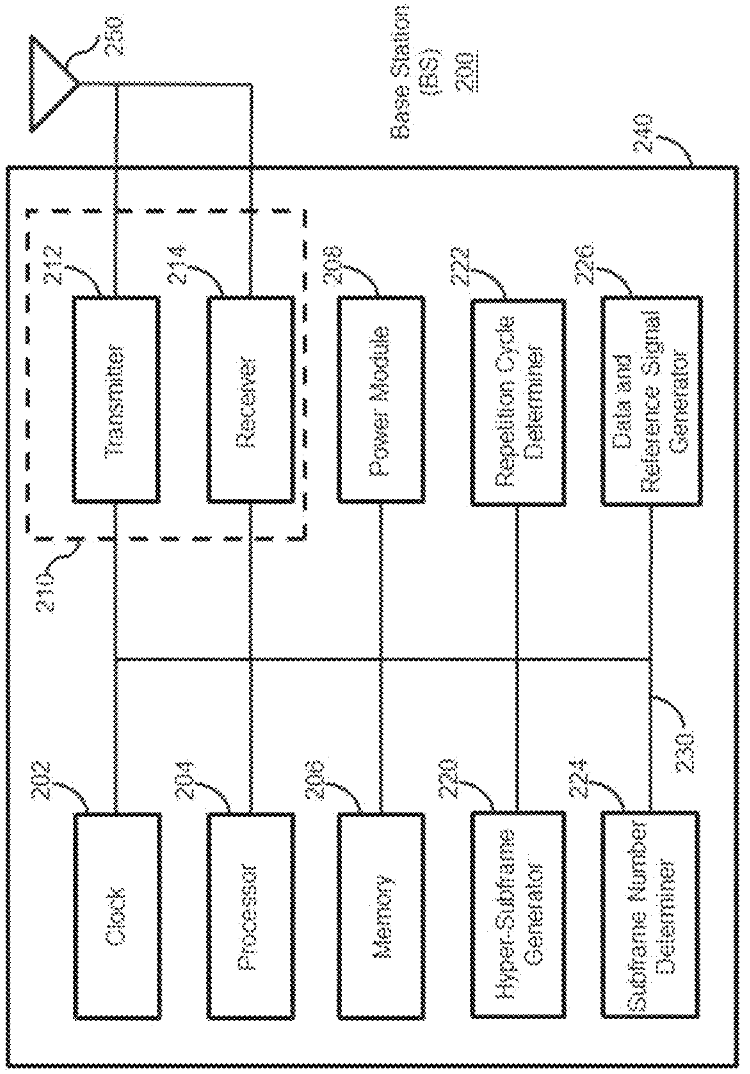
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a hyper-subframe generator 220, a repetition cycle determiner 222, a subframe number determiner 224, and a data and reference signal generator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication with frequency offset, e.g. due to a relative movement between the BS 200 and a UE, the hyper-subframe generator 220 may generate a hyper-subframe based on N identical subframes, wherein N is an integer equal to a positive power of two, e.g. 2, 4, 8, 16, etc. The subframe number determiner 224 in this example may determine and inform the UE about a value of the N by a broadcasting signaling or a specific signaling. The data and reference signal generator 226 in this example may generate and transmit, via the transmitter 212 to the UE, at least one signal in the hyper-subframe for frequency offset estimation at the UE. The at least one signal may comprise a data signal and/or a reference signal. According to various embodiments, the hyper-subframe is generated after or during a time-frequency domain resource mapping.

In one embodiment, each of the N identical subframes is obtained from a codeword to be repeated for M times. In one example, M is an integer equal to a positive power of two, e.g. 2, 4, 8, 16, etc. In one embodiment, the codeword occupies N_SF subframe(s) before repetition; and occupies N_SF*M subframes after repetition with a repetition cycle of N_SF*min (M, 4), wherein min (M, 4) represents a minimum of M and 4, N_SF is an integer between 1 and 10, and N is less than or equal to M.

In another embodiment, the codeword occupies N_SF*M hyper-subframes after repetition with a repetition cycle of N_SF*L, wherein L is an integer between 2 and M, and N_SF is an integer between 1 and 10. In this case, the repetition cycle determiner 222 may determine and inform the UE about a value of the L by a broadcasting signaling or a specific signaling.

In one embodiment, each of the N identical subframes comprises a plurality of symbols. The hyper-subframe comprises a plurality of symbol groups each of which includes N identical symbols from the N identical subframes respectively. In addition, the N identical symbols are bit-level identical after a bit-level scrambling based on a bit-level scrambling sequence.

In one embodiment, the hyper-subframe generator 220 may generate a plurality of hyper-subframes including the hyper-subframe based on the codeword repeated for M times. The N identical symbols are consecutive in the time domain after repetition. A re-initialization of the bit-level scrambling sequence is carried out at a beginning of each hyper-subframe.

In another embodiment, the hyper-subframe generator 220 may generate a plurality of hyper-subframes including the hyper-subframe based on the codeword repeated for M times. A re-initialization of the bit-level scrambling sequence is carried out at a beginning of every K hyper-subframes, wherein K is a positive integer.

In one embodiment, the plurality of symbol groups are mapped to the hyper-subframe in a time-frequency domain resource mapping for transmitting data signals in the hyper-subframe, with punctures on resource elements of data signals to transmit reference signals in the hyper-subframe as well. In this case, the N identical symbols in each of the plurality of symbol groups are consecutive in the time domain after the time-frequency domain resource mapping.

In another embodiment, the plurality of symbol groups are mapped to the hyper-subframe in a time-frequency domain resource mapping for transmitting data signals in the hyper-subframe, with a symbol-level interleaving to allocate resource elements for transmitting reference signals in the hyper-subframe as well. In this case, at least two of the N identical symbols in at least one of the plurality of symbol groups are not consecutive in the time domain after the time-frequency domain resource mapping.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the hyper-subframe generator 220. Conversely, each of the modules illustrated in FIG. 2 can be implemented using a plurality of separate components or elements.

Figure 3:
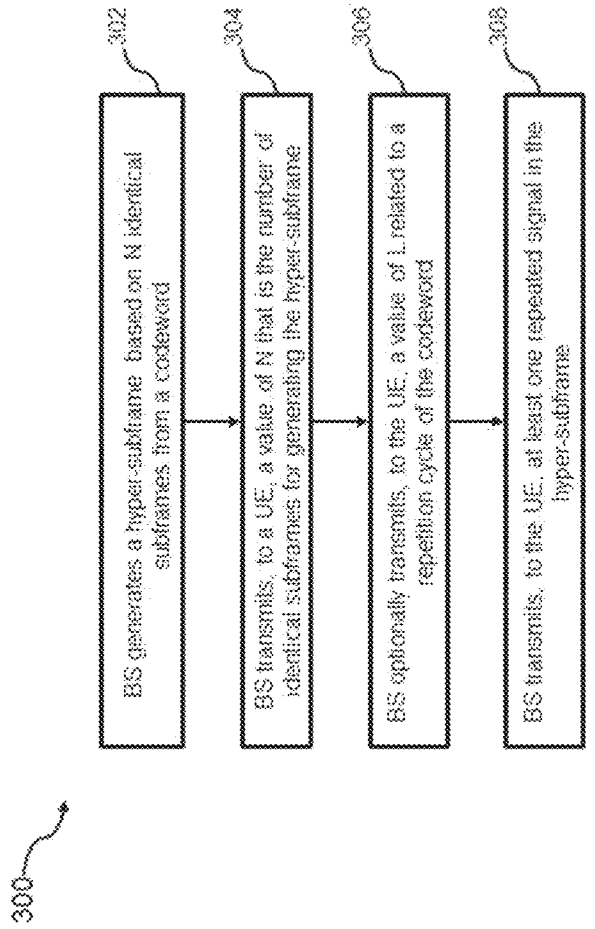
FIG. 3 illustrates a flow chart for a method performed by a BS, in accordance with some embodiments of the present disclosure.

FIG. 3 illustrates a flow chart for a method 300 performed by a BS, e.g. the BS 200 in FIG. 2, in accordance with some embodiments of the present disclosure. At operation 302, the BS generates a hyper-subframe based on N identical subframes from a codeword. At operation 304, the BS transmits, to a UE, a value of N that is the number of identical subframes for generating the hyper-subframe. Optionally at operation 306, the BS transmits, to the UE, a value of L related to a repetition cycle of the codeword. At operation 308, the BS transmits, to the UE, at least one repeated signal in the hyper-subframe, e.g. for frequency offset estimation. The order of the operations shown in FIG. 3 may be changed according to different embodiments of the present disclosure.

Figure 4:
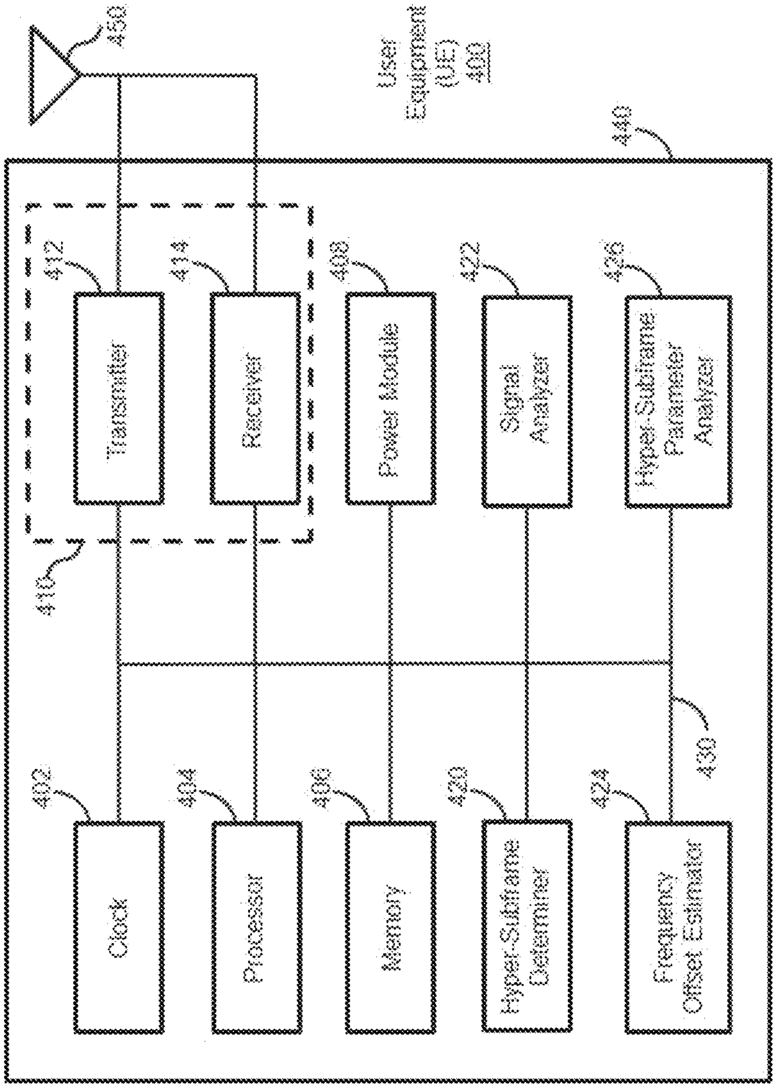
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a hyper-subframe determiner 420, a signal analyzer 422, a frequency offset estimator 424, and a hyper-subframe parameter analyzer 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The hyper-subframe determiner 420 in this example may determine a hyper-subframe based on N identical subframes, wherein N is an integer equal to a positive power of two, e.g. 2, 4, 8, 16, etc. The hyper-subframe parameter analyzer 426 in this example may receive, via the receiver 414 from a BS, a value of the N by a broadcasting signaling or a specific signaling. The signal analyzer 422 in this example may receive, via the receiver 414 from the BS, and analyze at least one signal in the hyper-subframe. The at least one signal may comprise a data signal and/or a reference signal. According to various embodiments, the hyper-subframe is generated after or during a time-frequency domain resource mapping. The frequency offset estimator 424 in this example may perform a frequency offset estimation based at least partially on the hyper-subframe.

In one embodiment, each of the N identical subframes is obtained from a codeword to be repeated for M times. In one example, M is an integer equal to a positive power of two, e.g. 2, 4, 8, 16, etc. In one embodiment, the codeword occupies N_SF subframe(s) before repetition; and occupies N_SF*M subframes after repetition with a repetition cycle of N_SF*min (M, 4), wherein min (M, 4) represents a minimum of M and 4, N_SF is an integer between 1 and 10, and N is less than or equal to M.

In another embodiment, the codeword occupies N_SF*M hyper-subframes after repetition with a repetition cycle of N_SF*L, wherein L is an integer between 2 and M, and N_SF is an integer between 1 and 10. In this case, the hyper-subframe parameter analyzer 426 may receive, via the receiver 414 from the BS, a value of the L by a broadcasting signaling or a specific signaling.

In one embodiment, each of the N identical subframes comprises a plurality of symbols. The hyper-subframe comprises a plurality of symbol groups each of which includes N identical symbols from the N identical subframes respectively. In addition, the N identical symbols are bit-level identical after a bit-level scrambling based on a bit-level scrambling sequence.

In one embodiment, the hyper-subframe determiner 420 may determine a plurality of hyper-subframes including the hyper-subframe based on the codeword repeated for M times. The N identical symbols are consecutive in the time domain after repetition. A re-initialization of the bit-level scrambling sequence is carried out at a beginning of each hyper-subframe.

In another embodiment, the hyper-subframe determiner 420 may determine a plurality of hyper-subframes including the hyper-subframe based on the codeword repeated for M times. A re-initialization of the bit-level scrambling sequence is carried out at a beginning of every K hyper-subframes, wherein K is a positive integer.

In one embodiment, the plurality of symbol groups are mapped to the hyper-subframe in a time-frequency domain resource mapping for transmitting data signals in the hyper-subframe, with punctures on resource elements of data signals to transmit reference signals in the hyper-subframe as well. In this case, the N identical symbols in each of the plurality of symbol groups are consecutive in the time domain after the time-frequency domain resource mapping.

In another embodiment, the plurality of symbol groups are mapped to the hyper-subframe in a time-frequency domain resource mapping for transmitting data signals in the hyper-subframe, with a symbol-level interleaving to allocate resource elements for transmitting reference signals in the hyper-subframe as well. In this case, at least two of the N identical symbols in at least one of the plurality of symbol groups are not consecutive in the time domain after the time-frequency domain resource mapping.

In some embodiments, the UE may transmit a generated hyper-subframe to the BS, such that the BS can perform frequency offset estimation at the BS side. That is, the frequency offset estimation may be performed based on either uplink transmissions or downlink transmissions.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the hyper-subframe determiner 420. Conversely, each of the modules illustrated in FIG. 4 can be implemented using a plurality of separate components or elements.

Figure 5:
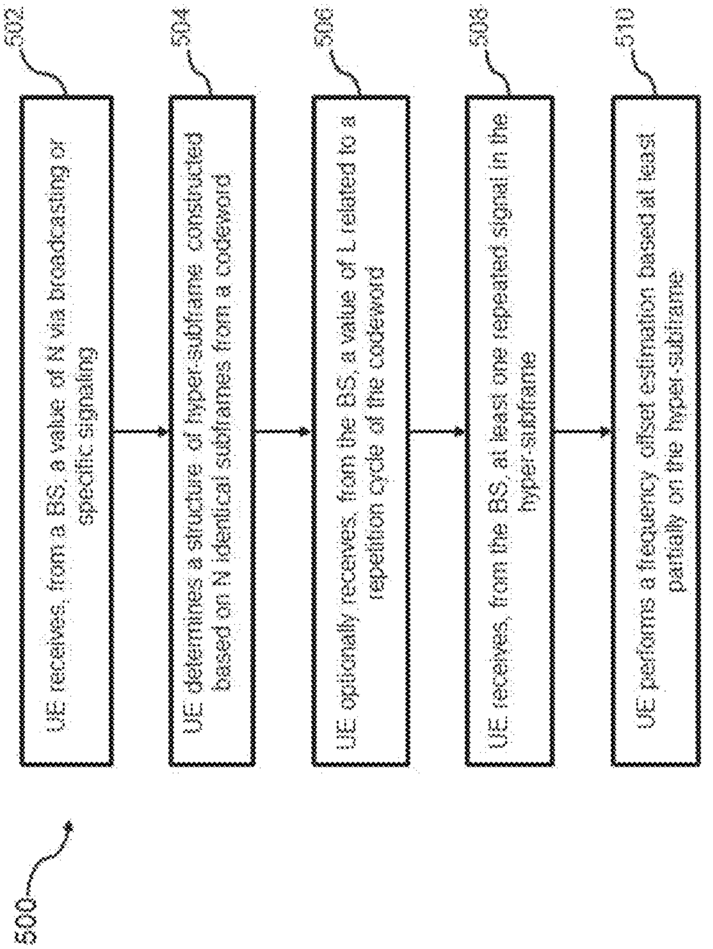
FIG. 5 illustrates a flow chart for a method performed by a UE, in accordance with some embodiments of the present disclosure.

FIG. 5 illustrates a flow chart for a method 500 performed by a UE, e.g. the UE 400 in FIG. 4, in accordance with some embodiments of the present disclosure. At operation 502, the UE receives, from a BS, a value of N via broadcasting or specific signaling. The UE determines at operation 504 a structure of hyper-subframe constructed based on N identical subframes from a codeword. Optionally at operation 506, the UE receives, from the BS, a value of L related to a repetition cycle of the codeword. At operation 508, the UE receives, from the BS, at least one repeated signal in the hyper-subframe. At operation 510, the UE performs a frequency offset estimation based at least partially on the hyper-subframe. The order of the operations shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

Figure 6:
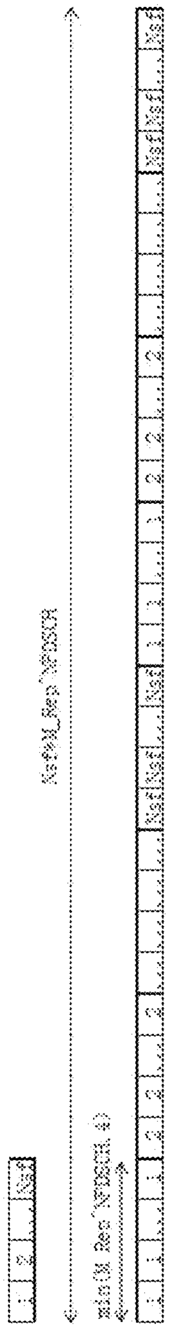
FIG. 6 illustrates an exemplary method for repeated transmission, in accordance with some embodiments of the present disclosure.

FIG. 6 illustrates an exemplary method for repeated transmission, in accordance with some embodiments of the present disclosure. As shown in FIG. 6, a repeated transmission may be used to combat large path loss. For example, in NB-IoT, a repetition in both UL and DL is used to achieve enough combination gain. Taking narrowband physical downlink shared channel (NPDSCH) as an example, a codeword occupying $N_{SF}$ subframes repeats $$M_{Rep}^{NPDSCH}$$

times. The time domain resource mapping is illustrated in FIG. 6. The $N_{SF}$ subframes are repeated for $$\min\left(M_{Rep}^{NPDSCH}, 4\right)$$

times. If $$M_{Rep}^{NPDSCH} > 4,$$

then another repetition cycle of length $$N_{SF} \cdot \min\left(M_{Rep}^{NPDSCH}, 4\right)$$

follows till $$N_{SF} \cdot M_{Rep}^{NPDSCH}$$

subframes are transmitted.

Figure 7:
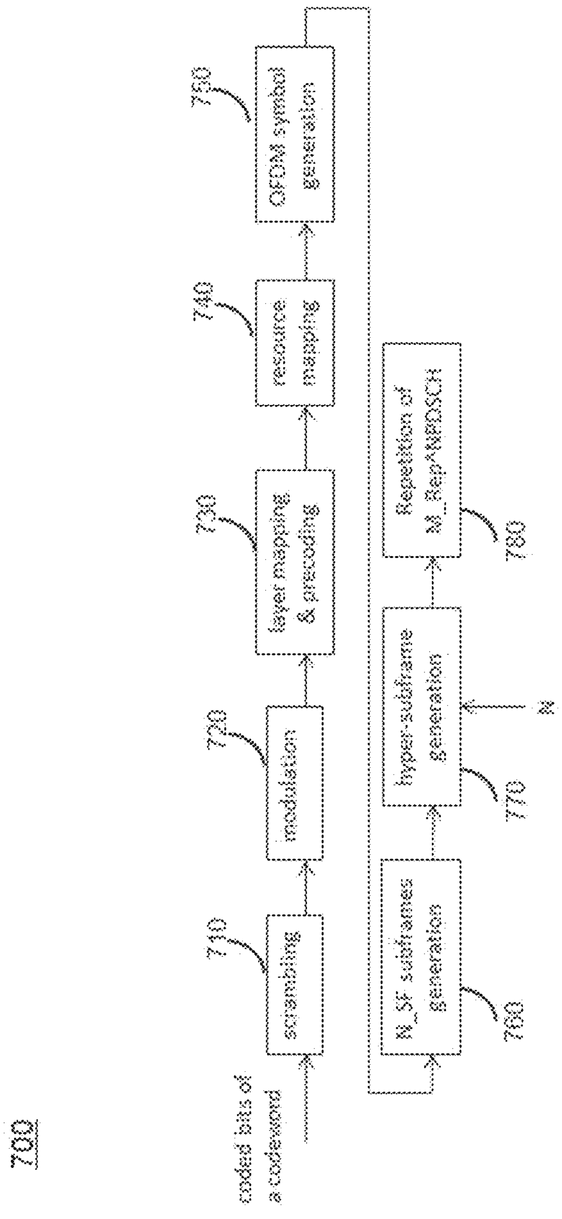
FIG. 7 illustrates a diagram of baseband signal processing with hyper-subframe generation, in accordance with some embodiments of the present disclosure.

In a first embodiment, a baseband signal processing diagram 700 is illustrated in FIG. 7. A block of hyper-subframe generation is added at operation 770. To generate hyper-subframes, the N (number of subframes in a hyper-subframe) value should be informed to the UE by the network, which can be carried by broadcast or UE-specific signaling.

In a first example, before modulation 720, a bit-level scrambling 710 is generally carried out. To enable data-aided FOE, multiple OFDM symbols with the same bit-level scrambling can be grouped according to their repetition pattern. Taking NB-IoT PDSCH not carrying broadcast control channel (BCCH) as an example, the resource mapping is designed as shown in FIG. 8A to FIG. 8C.

Figure 8A:
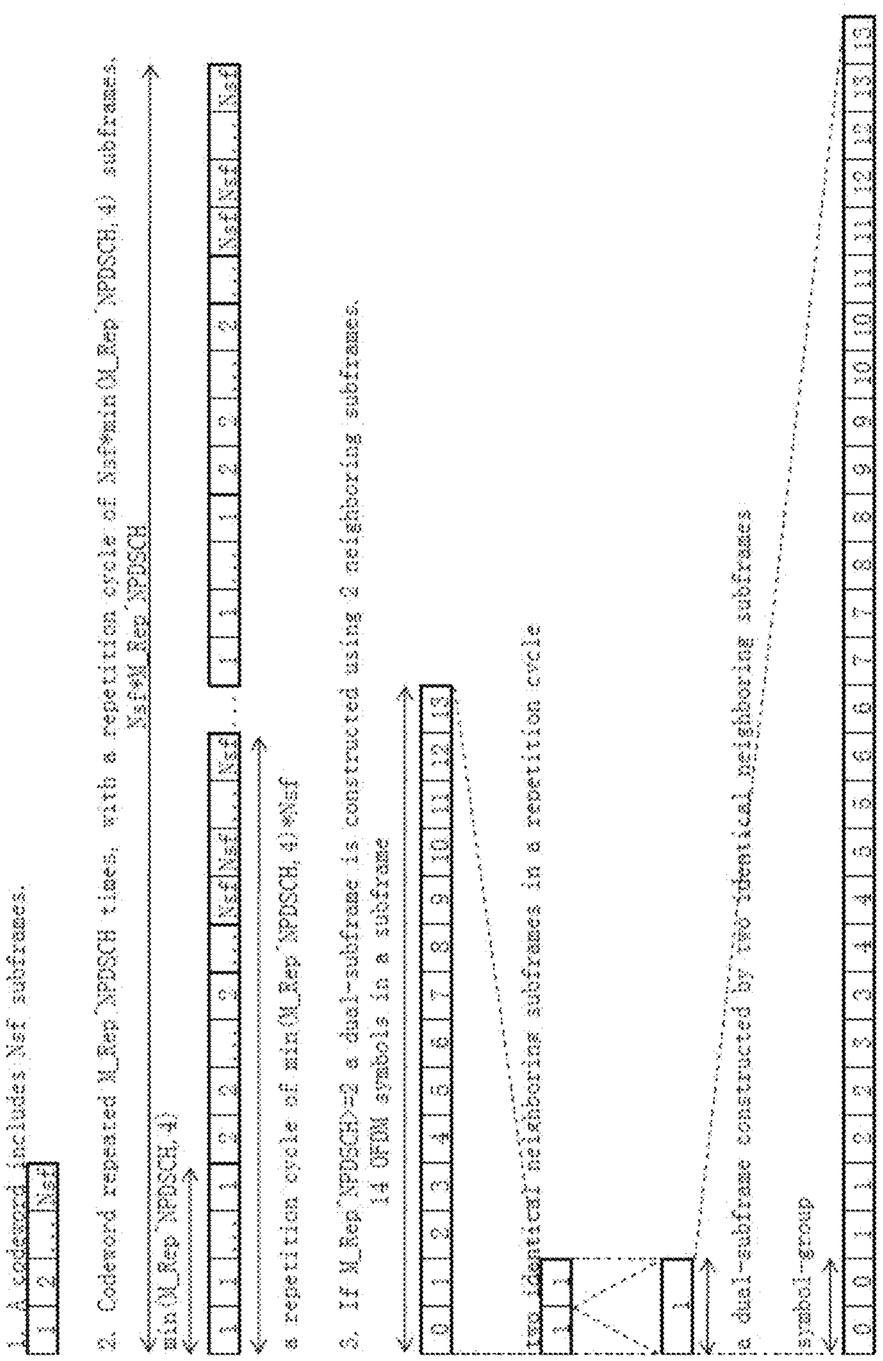
FIGS. 8A-8C illustrate an exemplary method for generating dual-subframes after resource mapping, in accordance with some embodiments of the present disclosure.
Figure 8B:
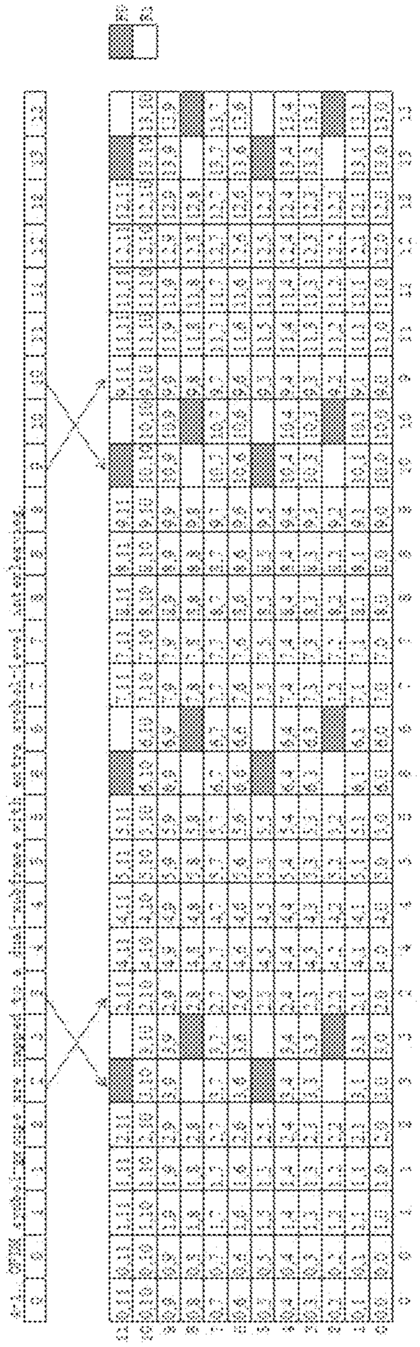
Figure 8C:
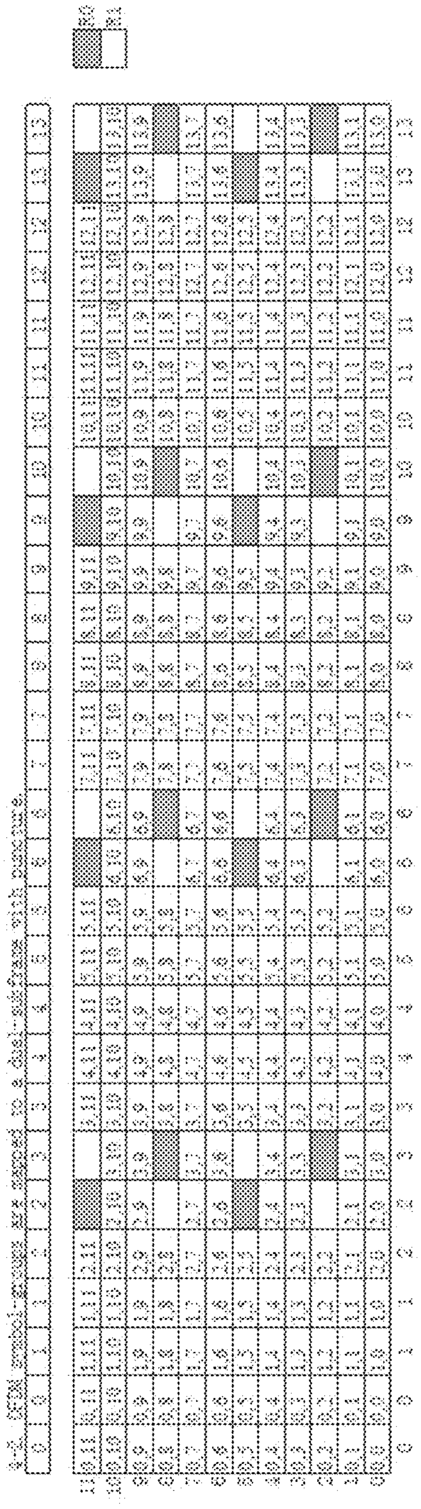

At operations 1 and 2 in FIG. 8A, a codeword occupies $$N_{SF} \cdot M_{Rep}^{NPDSCH}$$

subframes using a repetition cycle of $$N_{SF} \cdot \min\left(M_{Rep}^{NPDSCH}, 4\right)$$

with $N_{SF} \in [1, 2, 3, 4, 5, 6, 8, 10]$ and $$M_{Rep}^{NPDSCH} \in [1, 2, 4, 8, 16, 32, 64, 128, 192, 256, 384, 512, 768, 1024, 1536, 2048].$$

If $$M_{Rep}^{NPDSCH} >= 2,$$

a dual-subframe can be constructed at operation 3 in FIG. 8A using 2 neighboring subframes. The symbol 0 in the 2 identical neighboring subframes are grouped and mapped to the first two symbols in the dual-subframe; the symbol 1 in the 2 identical neighboring subframes are grouped and mapped to the next two symbols in the dual-subframe; so on and so forth, such that all 14 symbol-groups form a dual-subframe. A series of dual-subframes are formed with the same manner. The dual-subframe construction can be specified with resource mapping rule or symbol-level interleaving rule among subframes.

In a stand-alone deployment, narrowband reference signal (NRS) on 2 antenna ports R0, R1 occupies the highlighted REs in FIG. 8B and FIG. 8C. There are 2 options for the OFDM symbol mapping as shown in FIG. 8B and FIG. 8C respectively. The OFDM symbol index (k,l) is marked, where k and l stand for time and frequency domain indexes, respectively.

As shown by operation 4-1 in FIG. 8B, a symbol-level interleaving or column exchange can be used, to reserve REs for the NRS on R0 and R1 antenna ports, where the exchanged symbol index is marked.

As shown by operation 4-2 in FIG. 8C, puncture can be used to allocate REs for the NRS on R0 and R1 antenna ports. The REs occupied by NRS cannot be used in NPDSCH mapping and the corresponding OFDM symbols are punctured.

Figure 9A:
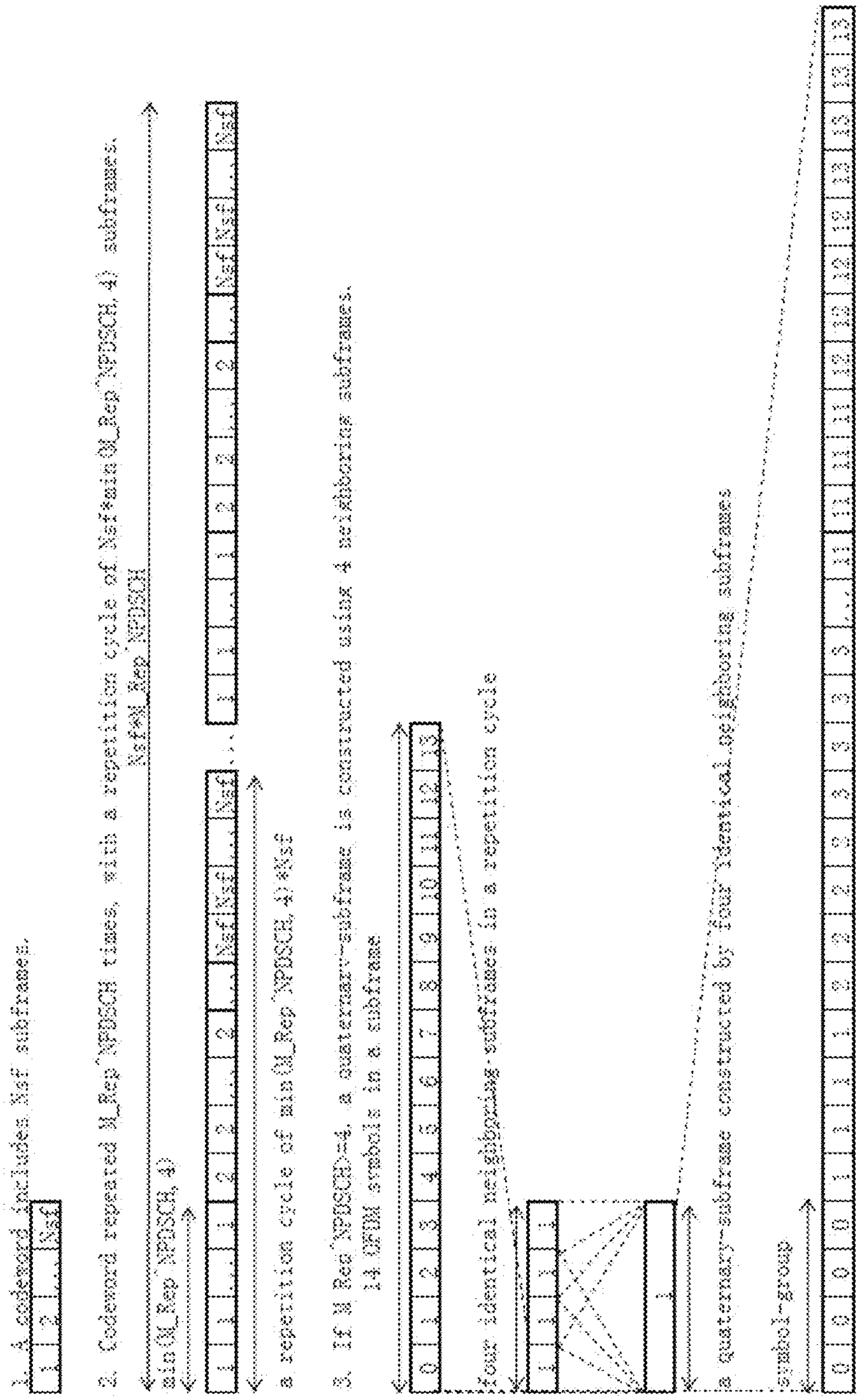
FIGS. 9A-9B illustrate an exemplary method for generating quaternary-subframes after resource mapping, in accordance with some embodiments of the present disclosure.
Figure 9B:
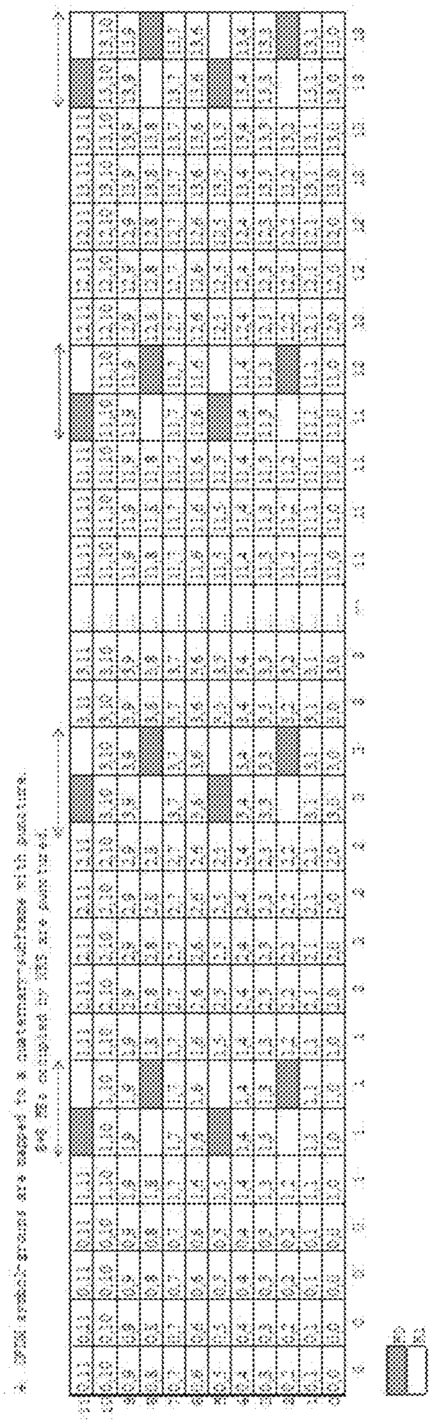

In a second example, a method similar to that in the first example can be used to enable data-aided FOE, with the resource mapping designed as shown in FIG. 9A to FIG. 9B. At operations 1 and 2 in FIG. 9A, a codeword occupies $$N_{SF} \cdot M_{Rep}^{NPDSCH}$$

subframes using a repetition cycle of $$N_{SF} \cdot \min\left(M_{Rep}^{NPDSCH}, 4\right),$$

with $N_{SF} \in [1, 2, 3, 4, 5, 6, 8, 10]$ and $$M_{Rep}^{NPDSCH} \in [1, 2, 4, 8, 16, 32, 64, 128, 192, 256, 384, 512, 768, 1024, 1536, 2048].$$

When $$M_{Rep}^{NPDSCH} >= 4,$$

a quaternary-subframe can be constructed using 4 neighboring subframes as shown at operation 3 in FIG. 9A. The symbol 0 in the 4 identical neighboring subframes are grouped and mapped to the first four symbols in the quaternary-subframe; the symbol 1 in the 4 identical neighboring subframes are grouped and mapped to the next four symbols in the quaternary-subframe; so on and so forth. In total, 14 symbol-groups form a quaternary-subframe. A series of quaternary-subframes are formed with the same manner. The quaternary-subframe construction can be specified with resource mapping rule or symbol-level interleaving rule among subframes.

In a stand-alone deployment, NRS on 2 antenna ports R0 and R1 occupies the highlighted REs in FIG. 9B. The REs occupied by NRS cannot be used in NPDSCH mapping and the corresponding OFDM symbols are punctured. The OFDM symbol index (k,l) is marked, where k and l stands for time and frequency domain indexes, respectively.

Figure 10A:
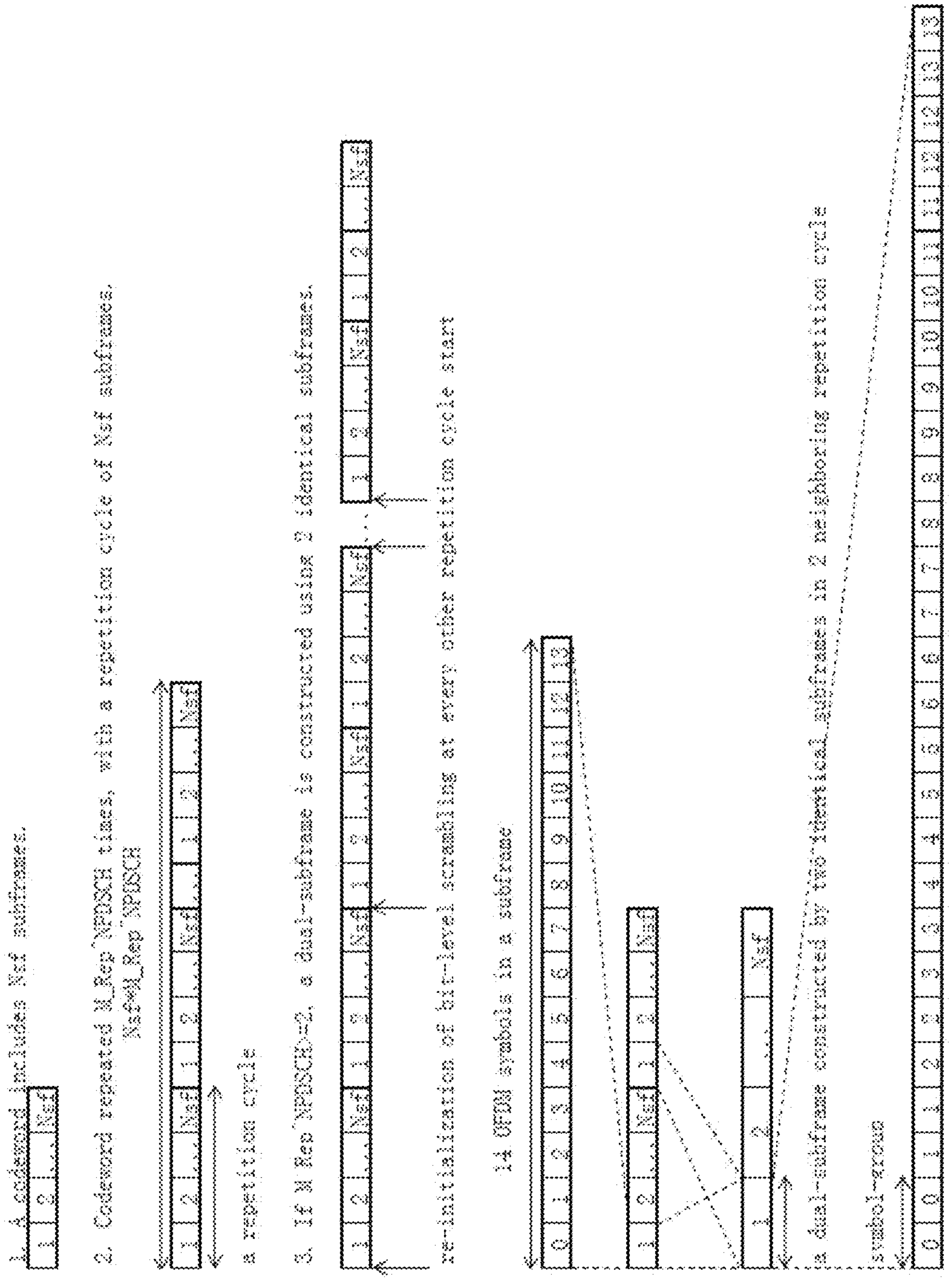
FIGS. 10A-10C illustrate another exemplary method for generating dual-subframes after resource mapping, in accordance with some embodiments of the present disclosure.

In a third example, different repetition pattern may be used in transmission, as shown in FIG. 10A, in which a codeword occupies $$N_{SF} \cdot M_{Rep}^{NPDSCH}$$

subframes with a repetition cycle of $N_{SF}$ NPDSCH

If $$M_{Rep}^{NPDSCH} >= 2,$$

a dual-subframe can be constructed at operation 3 in FIG. 10A using two identical subframes from neighboring repetition cycles. To ensure the two subframes are bit-level identical, the re-initialization of bit-level scrambling may be carried out at the start of every other repetition cycle as shown in FIG. 10A.

The symbol 0 in the 2 identical neighboring subframes are grouped and mapped to the first two symbols in the dual-subframe; the symbol 1 in the 2 identical neighboring subframes are grouped and mapped to the next two symbols in the dual-subframe; so on and so forth. In total, 14 symbol-groups form a dual-subframe. A series of dual-subframes are formed with the same manner. The dual-subframe construction can be specified with resource mapping rule or symbol-level interleaving rule among subframes.

Figure 10B:
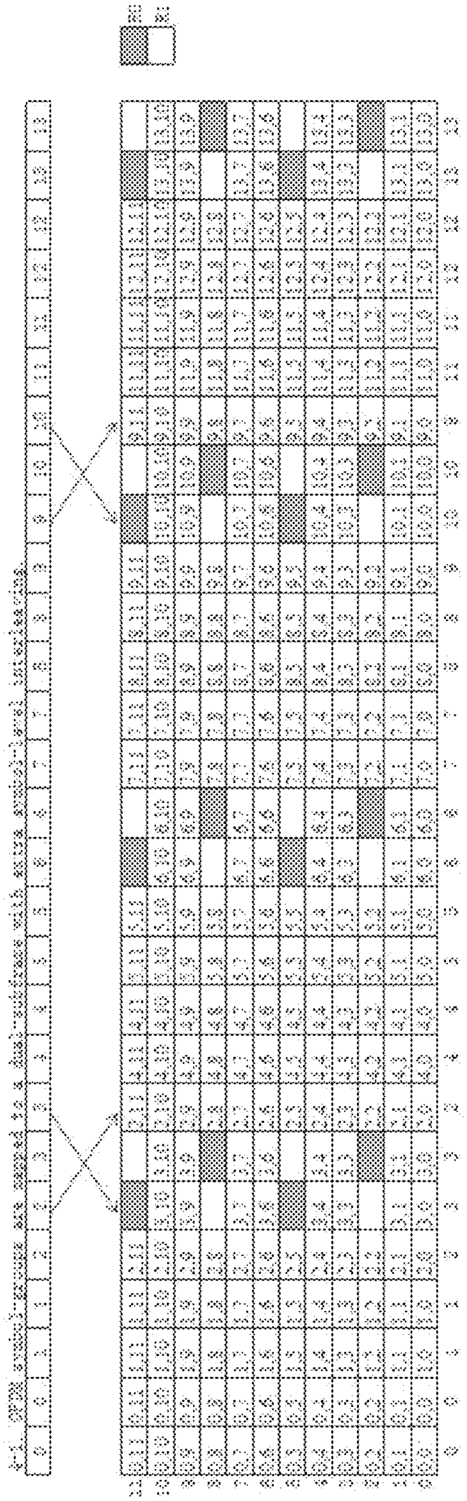
Figure 10C:
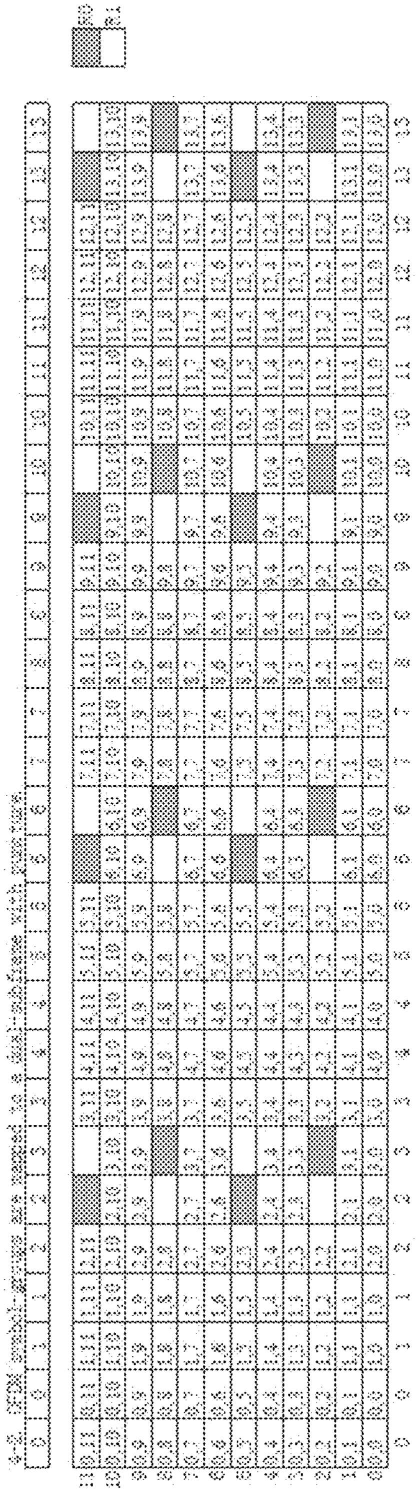

In a stand-alone deployment, NRS on 2 antenna ports occupies the highlighted REs as shown in FIG. 10B and FIG. 10C. There are 2 options for the OFDM symbol mapping as shown in FIG. 10B and FIG. 10C respectively. The OFDM symbol index (k,l) is marked, where k and l stands for time and frequency domain indexes, respectively.

As shown by operation 4-1 in FIG. 10B, a symbol-level interleaving or column exchange can be used, to reserve REs for the NRS on R0 and R1 antenna ports, where the exchanged symbol index is marked.

As shown by operation 4-2 in FIG. 10C, puncture can be used to allocate REs for the NRS on R0 and R1 antenna ports. The REs occupied by NRS cannot be used in NPDSCH mapping and the corresponding OFDM symbols are thus punctured.

Figure 11:
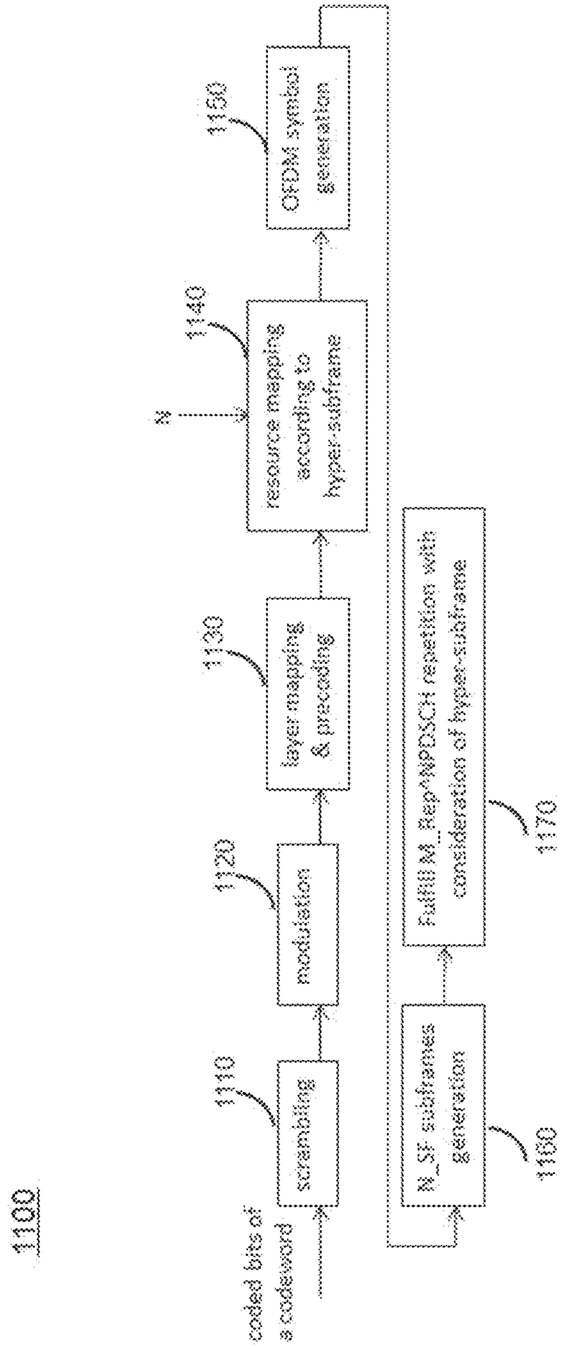
FIG. 11 illustrates a diagram of a baseband signal processing with resource mapping according a generated hyper-subframe, in accordance with some embodiments of the present disclosure.

In a second embodiment, a baseband signal processing diagram 1100 is illustrated in FIG. 11. A hyper-subframe can be generated in resource mapping block 1140, where symbol-level repetition is carried out. To generate hyper-subframe, the N (number of subframes in a hyper-subframe) value may be informed to UE by the network, which can be carried by broadcast or UE-specific signaling.

In a fourth example according to the second embodiment, before modulation 1120, bit-level scrambling 1110 is generally carried out. To enable data-aided FOE, multiple OFDM symbols with the same bit-level scrambling can be mapped with symbol-level repetition. At operation 1 in FIG. 12A, a codeword includes $N_{SF}$ subframes and is to be repeated for $$M_{Rep}^{NPDSCH}$$

times.

Figure 12A:
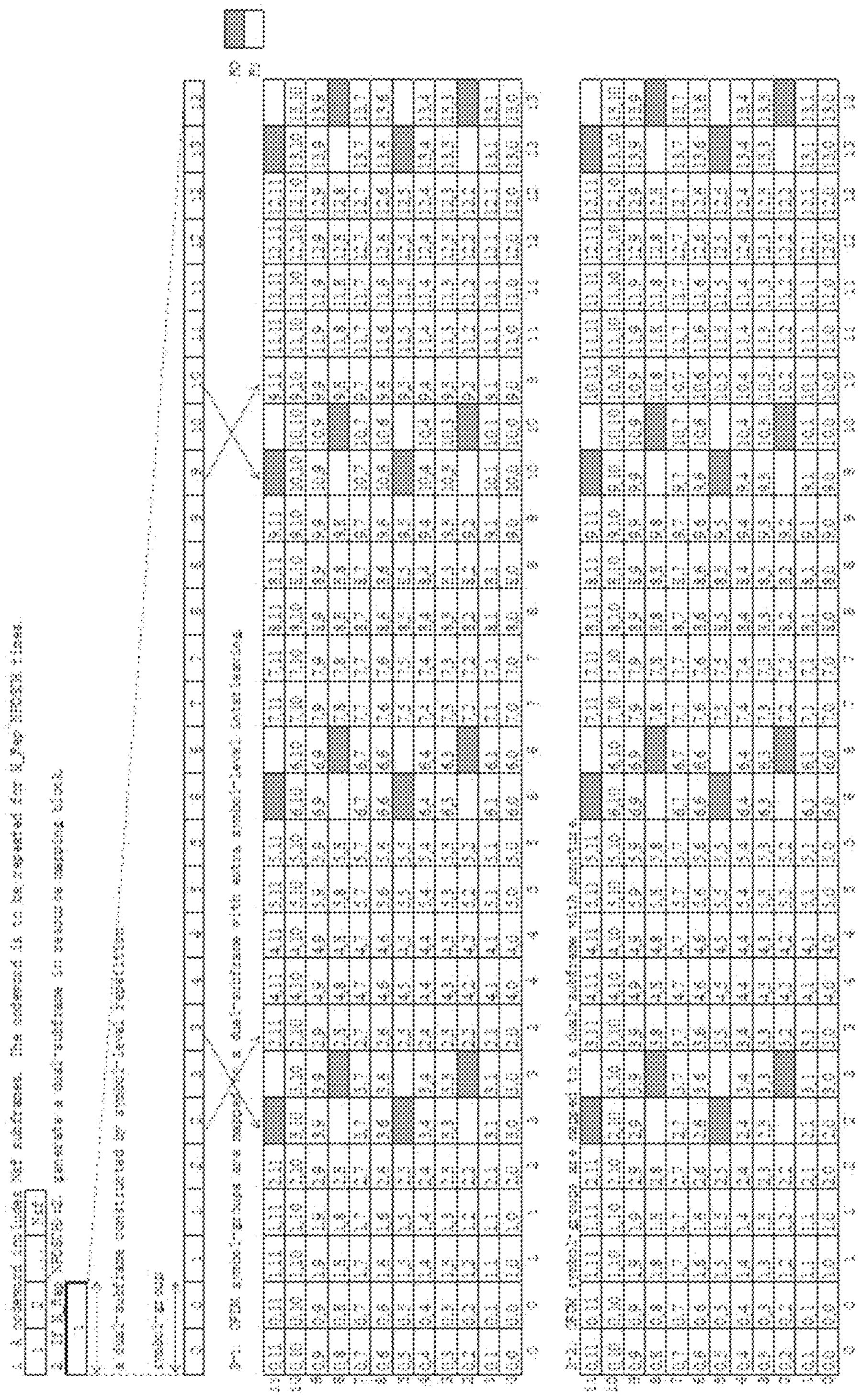
FIGS. 12A-12B illustrate an exemplary method for resource mapping according a generated dual-subframe, in accordance with some embodiments of the present disclosure.

If $$M_{Rep}^{NPDSCH} >= 2,$$

a dual-subframe can be constructed at operation 2 in FIG. 12A with symbol-level repetition in resource mapping. The symbol 0 in the 2 identical neighboring subframes are grouped and mapped to the first two symbols in the dual-subframe; the symbol 1 in the 2 identical neighboring subframes are grouped and mapped to the next two symbols in the dual-subframe; so on and so forth. In total, 14 symbol-groups form a dual-subframe. A series of dual-subframes are formed with the same manner. The dual-subframe construction can be specified with resource mapping rule or symbol-level interleaving rule among subframes.

In a stand-alone deployment, NRS on 2 antenna ports R0 and R1 occupies the highlighted REs in FIG. 12A. There are 2 options for the OFDM symbol mapping as shown at operations 3-1 and 3-2 respectively. The OFDM symbol index (k,l) is marked, where k and l stands for time and frequency domain indexes, respectively.

As shown by operation 3-1 in FIG. 12A, a symbol-level interleaving or column exchange can be used, to reserve REs for the NRS on R0 and R1 antenna ports, where the exchanged symbol index is marked.

As shown by operation 3-2 in FIG. 12A, puncture can be used to allocate REs for the NRS on R0 and R1 antenna ports. The REs occupied by NRS cannot be used in NPDSCH mapping and the corresponding OFDM symbols are thus punctured.

Figure 12B:
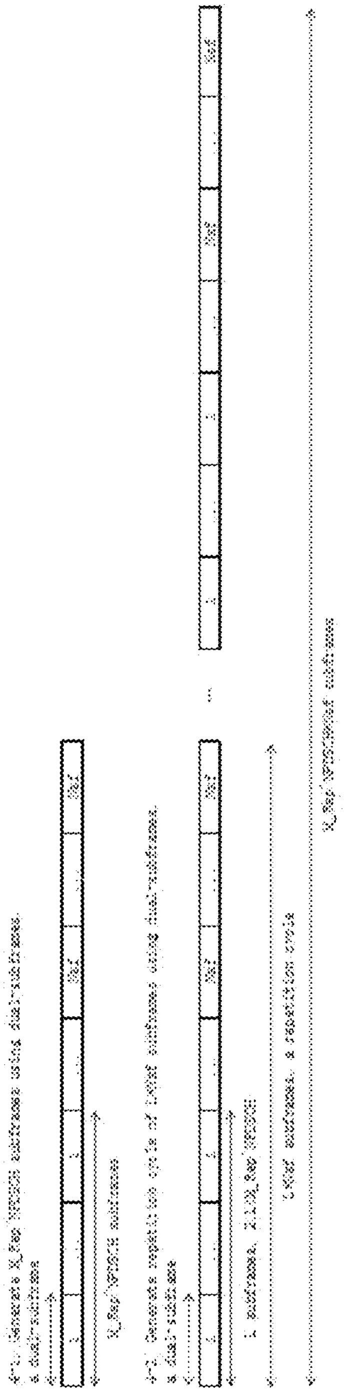

To complete $$N_{SF} \cdot M_{Rep}^{NPDSCH}$$

subframes, there are 2 options as shown in FIG. 12B at operations 4-1 and 4-2 respectively. As illustrated in operation 4-1 in FIG. 12B, where each of dual-subframe 1 to dual-subframe $N_{SF}$ is repeated for $$M_{Rep}^{NPDSCH}$$

times to occupy $$M_{Rep}^{NPDSCH}$$

dual-subframes continuously; and dual-subframes 1 to $N_{SF}$ concatenate in the time domain. As illustrated in operation 4-2 in FIG. 12B, where a repetition cycle of $L \cdot N_{SF}$ (with $$L < M_{Rep}^{NPDSCH})$$

subframes (dual-subframes) is constructed and then concatenates. The latter structure probably enables more timely reception processing with less energy consumption at UE side. That is, a UE can stop its reception immediately after it successfully decodes the codeword using received repetition cycles.

In a fifth example according to the second embodiment, a method similar to that in the fourth example can be used to enable data-aided FOE, where multiple OFDM symbols with the same bit-level scrambling can be mapped with symbol-level repetition. At operation 1 in FIG. 13A, a codeword includes $N_{SF}$ subframes and is to be repeated for $$M_{Rep}^{NPDSCH}$$

times.

Figure 13A:
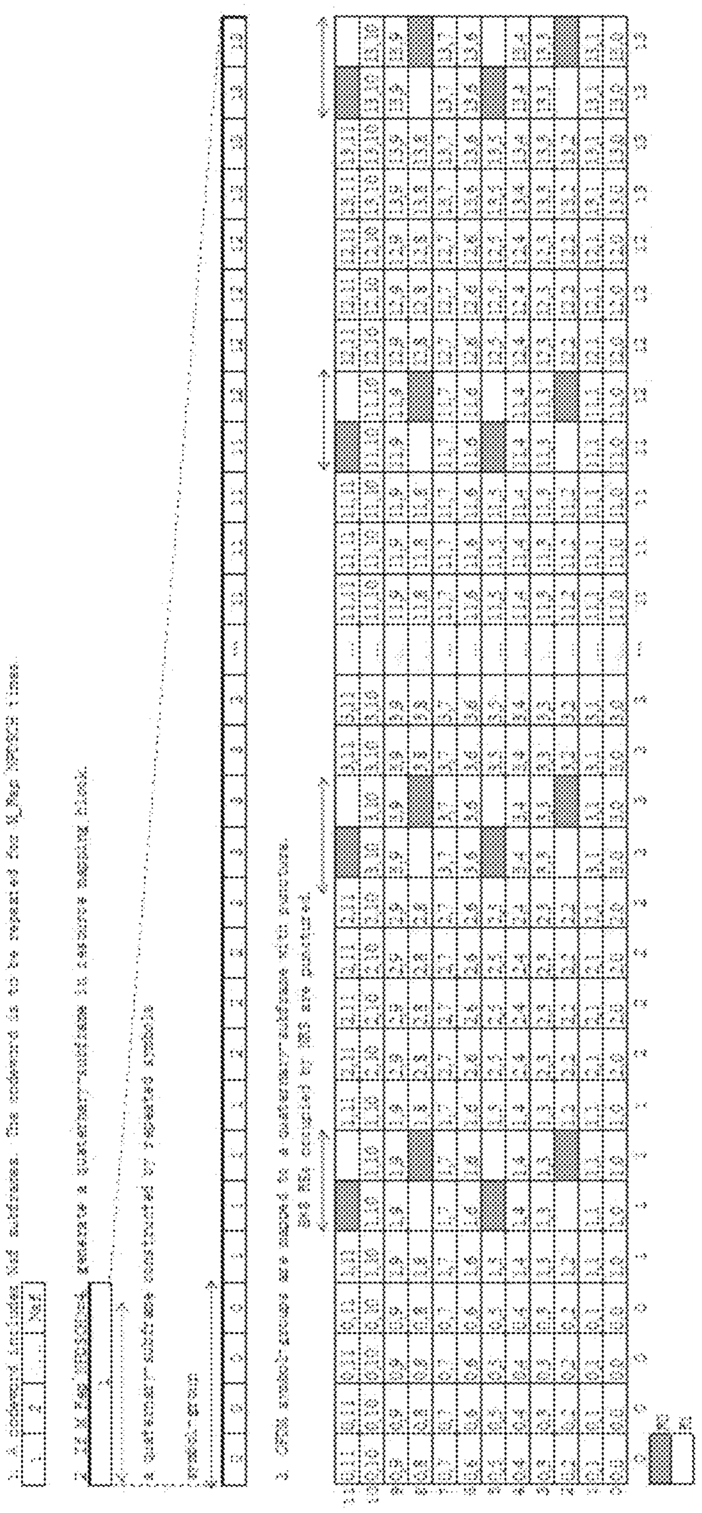
FIGS. 13A-13B illustrate an exemplary method for resource mapping according a generated quaternary-subframe, in accordance with some embodiments of the present disclosure.

When $$M_{Rep}^{NPDSCH} >= 4,$$

a quaternary-subframe can be constructed at operation 2 in FIG. 13A using resource mapping with symbol-level repetition. The symbol 0 in the 4 identical neighboring subframes are grouped and mapped to the first four symbols in the quaternary-subframe; the symbol 1 in the 4 identical neighboring subframes are grouped and mapped to the next four symbols in the quaternary-subframe; so on and so forth. In total, 14 symbol-groups form a quaternary-subframe. A series of quaternary-subframes are formed with the same manner. The quaternary-subframe construction can be specified with resource mapping rule or symbol-level interleaving rule among subframes.

In a stand-alone deployment, NRS on 2 antenna ports R0 and R1 occupies the highlighted REs at operation 3 in FIG. 13A. The REs occupied by NRS cannot be used in NPDSCH mapping and the corresponding OFDM symbols are punctured. The OFDM symbol index (k,l) is marked, where k and l stands for time and frequency domain indexes, respectively.

Figure 13B:
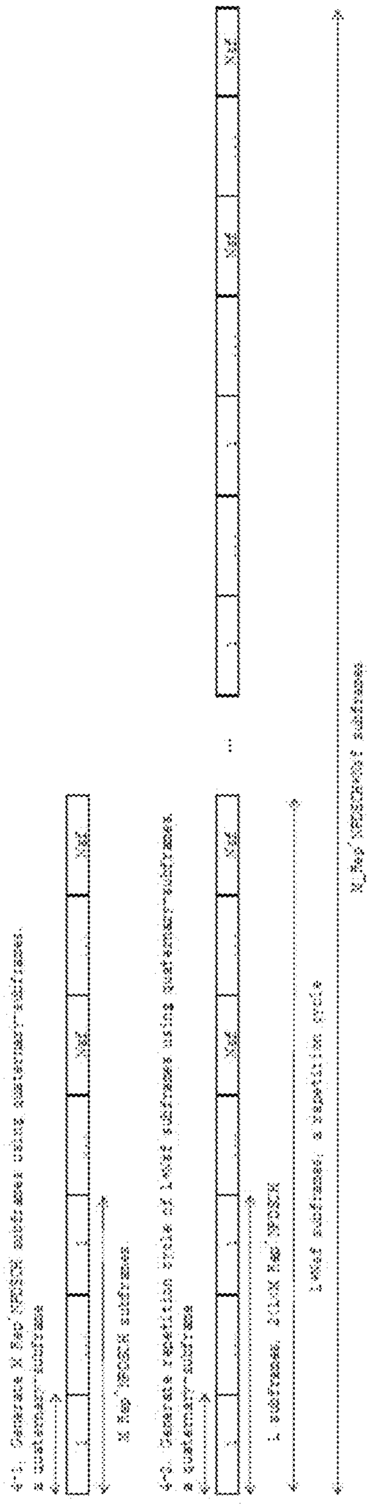

To complete $$N_{SF} \cdot M_{Rep}^{NPDSCH}$$

subframes, there are 2 options. One is illustrated in 4-1 in FIG. 13B, where each of subframe (which means quaternary-subframe in this example) 1 to subframe $N_{SF}$ is repeated for $$M_{Rep}^{NPDSCH}$$

times to occupy $$M_{Rep}^{NPDSCH}$$

subframes continuously; and subframes 1 to $N_{SF}$ concatenate in the time domain. The other is illustrated in 4-2 in FIG. 13B, where a repetition cycle of $L \cdot N_{SF}$ (with $$L < M_{Rep}^{NPDSCH})$$

subframes (quaternary-subframes) is constructed and then concatenates. The latter structure probably enables more timely reception processing with less energy consumption at UE side. That is, a UE can stop its reception immediately after it successfully decodes the codeword using received repetition cycles.

In the present application, the technical features in the various embodiments and examples can be used in combination in one embodiment without conflict. Each embodiment is merely an exemplary embodiment of the present application.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term “configured to” or “configured for” as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, the method comprising:

generating a hyper-subframe based on N identical subframes, wherein each of the N identical subframes comprises a plurality of symbols, the hyper-subframe comprises fourteen symbol groups each of which includes N identical symbols from the N identical subframes respectively, wherein the N identical symbols in a given symbol group are bit-level identical, and wherein N is an integer larger than one and is equal to a positive power of two; and transmitting, to a wireless communication device, at least one signal in the hyper-subframe.

2. The method of claim 1, wherein:

each of the N identical subframes is obtained from a codeword to be repeated for M times; and M is an integer larger than one.

3. The method of claim 2, wherein:

M is an integer equal to a positive power of two; and

N is less than or equal to M.

4. The method of claim 2, wherein:

the codeword occupies N_SF*M subframes after repetition with a repetition cycle of N_SF*L;

L is an integer between 2 and M; and

N_SF is a positive integer.

5. The method of claim 4, further comprising:

informing the wireless communication device about a value of the L by a broadcasting signaling or a specific signaling.

6. The method of claim 1, further comprising:

generating a plurality of hyper-subframes including the hyper-subframe based on a codeword repeated for M times, wherein:

the N identical symbols are consecutive in a time domain after repetition; and a re-initialization of a bit-level scrambling sequence is carried out at a beginning of each hyper-subframe.

7. The method of claim 1, further comprising:

generating a plurality of hyper-subframes including the hyper-subframe based on a codeword repeated for M times, wherein:

a re-initialization of a bit-level scrambling sequence is carried out at a beginning of every K hyper-subframes; and K is a positive integer.

8. The method of claim 1, wherein:

the hyper-subframe is generated after or during a time-frequency domain resource mapping.

9. The method of claim 1, further comprising:

informing the wireless communication device about a value of the N by a broadcasting signaling or a specific signaling.

10. The method of claim 1, wherein a bit-level scrambling is performed prior to modulation, and wherein multiple symbols with a same bit-level scrambling are grouped according to their repetition pattern.

11. A method performed by a wireless communication device, the method comprising:

determining a hyper-subframe based on N identical subframes, wherein each of the N identical subframes comprises a plurality of symbols, the hyper-subframe comprises fourteen symbol groups each of which includes N identical symbols from the N identical subframes respectively, wherein the N identical symbols in a given symbol group are bit-wise identical, and wherein N is an integer larger than one and is equal to a positive power of two; and receiving, from a wireless communication node, at least one signal in the hyper-subframe.

12. The method of claim 11, wherein:

each of the N identical subframes is obtained from a codeword to be repeated for M times; and M is an integer larger than one.

13. The method of claim 12, wherein:

M is an integer equal to a positive power of two; and

N is less than or equal to M.

14. The method of claim 12, wherein:

the codeword occupies N_SF*M subframes after repetition with a repetition cycle of N_SF*L;

L is an integer between 2 and M; and

N_SF is a positive integer.

15. The method of claim 11, wherein:

the symbol groups are mapped to the hyper-subframe in a time-frequency domain resource mapping for receiving data signals in the hyper-subframe, with punctures on resource elements corresponding to data signals to receive reference signals in the hyper-subframe as well; and the N identical symbols in each of the plurality of symbol groups are consecutive in a time domain after the time-frequency domain resource mapping.

16. The method of claim 11, wherein:

the symbol groups are mapped to the hyper-subframe in a time-frequency domain resource mapping for receiving data signals in the hyper-subframe, with a symbol-level interleaving to allocate resource elements for receiving reference signals in the hyper-subframe as well; and at least two of the N identical symbols in at least one of the symbol groups are not consecutive in a time domain after the time-frequency domain resource mapping.

17. The method of claim 11, wherein:

the hyper-subframe is determined after or during a time-frequency domain resource mapping.

18. The method of claim 11, further comprising:

receiving, from the wireless communication node, a value of the N by a broadcasting signaling or a specific signaling.

19. The method of claim 11, wherein a bit-level scrambling is performed prior to modulation, and wherein multiple symbols with a same bit-level scrambling are grouped according to their repetition pattern.

20. A wireless communication node comprising:

a memory comprising a plurality of instructions; and a processor configured to execute the plurality of instructions, and upon execution of the plurality of instructions, is configured to:

generate a hyper-subframe based on N identical subframes, wherein each of the N identical subframes comprises a plurality of symbols, the hyper-subframe comprises fourteen symbol groups each of which includes N identical symbols from the N identical subframes respectively, wherein the N identical symbols in a given symbol group are bit-level identical, and wherein N is an integer larger than one and is equal to a positive power of two; and transmit, to a wireless communication device, at least one signal in the hyper-subframe.

* * * * *